United States Patent
Fingerhut

(10) Patent No.: US 8,784,605 B2
(45) Date of Patent: Jul. 22, 2014

(54) PROCESS FOR MAKING LIGHTWEIGHT LAMINATED PANEL MATERIAL FOR CONSTRUCTION OF CARGO CONTAINERS

(75) Inventor: Richard L. Fingerhut, Tarzana, CA (US)

(73) Assignee: International Composites Technologies, Inc., Compton, CA (US)

(*) Notice: Subject to any disclaimer, the term of this patent is extended or adjusted under 35 U.S.C. 154(b) by 464 days.

(21) Appl. No.: 13/151,191

(22) Filed: Jun. 1, 2011

(65) Prior Publication Data

US 2012/0055625 A1 Mar. 8, 2012

Related U.S. Application Data

(60) Provisional application No. 61/350,855, filed on Jun. 2, 2010.

(51) Int. Cl.
- B32B 37/00 (2006.01)
- B29C 65/00 (2006.01)

(52) U.S. Cl.
USPC .................. 156/311; 156/289; 156/308.2

(58) Field of Classification Search
USPC ........ 156/289, 306.6, 308.2, 309.6, 323, 311, 156/324
See application file for complete search history.

(56) References Cited

U.S. PATENT DOCUMENTS

| | | | |
|---|---|---|---|
| 4,212,406 A | 7/1980 | Mittelmann | |
| 4,833,771 A | 5/1989 | Dunwoodie | |
| 5,102,723 A | 4/1992 | Pepin | |
| 5,180,078 A | 1/1993 | Looker | |
| 5,195,701 A | 3/1993 | Willan | |
| 5,249,534 A | 10/1993 | Sacks | |
| 5,267,665 A | 12/1993 | Sanai et al. | |
| 5,312,182 A | 5/1994 | Mlakar et al. | |
| 5,328,268 A | 7/1994 | Lafleur | |
| 5,360,129 A | 11/1994 | Lee | |
| RE34,892 E | 4/1995 | Dunwoodie | |
| 5,413,410 A | 5/1995 | Mlakar | |
| 5,421,804 A | 6/1995 | LaFleur | |
| 5,425,456 A | 6/1995 | Erickson | |
| 5,522,340 A | 6/1996 | Skogman | |
| 5,542,765 A | 8/1996 | Smith et al. | |

(Continued)

FOREIGN PATENT DOCUMENTS

| EP | 0301624 A2 | 2/1989 |
|---|---|---|
| WO | 8803743 A1 | 5/1988 |
| WO | 2006124825 A2 | 11/2006 |

OTHER PUBLICATIONS

EPO, International Search Report and Written Opinion for PCT international Application No. PCT/US2011/038888 dated Sep. 13, 2011.

Primary Examiner — John Goff
(74) Attorney, Agent, or Firm — Fulwider Patton LLP

(57) ABSTRACT

A process for making a lightweight laminated panel material for construction of cargo containers includes providing a high performance fabric layer, placing film adhesive layers over both sides of the high performance fabric layer, placing protective surface film layers over the film adhesive layers to form a pre-lamination stack, and placing release layers over the protective surface film layers. The pre-lamination stack is heated, compressed, and maintained at the temperature and under pressure to form a lamination stack. The lamination stack is cooled to an intermediate temperature and released from pressure, cooled further, and the release layers are removed.

12 Claims, 1 Drawing Sheet

(56) References Cited

U.S. PATENT DOCUMENTS

| | | |
|---|---|---|
| 5,595,305 A | 1/1997 | Hart |
| 5,595,431 A | 1/1997 | Mlakar |
| 5,599,082 A | 2/1997 | Mlakar et al. |
| 5,645,184 A | 7/1997 | Rowse et al. |
| 5,741,744 A | 4/1998 | Fitchmun |
| 5,769,257 A | 6/1998 | Fleisher et al. |
| 5,789,327 A * | 8/1998 | Rousseau ............ 442/135 |
| 5,890,612 A | 4/1999 | Coppi |
| 5,967,357 A | 10/1999 | Kellogg et al. |
| 6,237,793 B1 | 5/2001 | Fingerhut et al. |
| 6,818,091 B1 * | 11/2004 | Holland et al. ............ 156/309.6 |
| 2008/0277048 A1 * | 11/2008 | Geva et al. ............ 156/221 |
| 2009/0278281 A1 * | 11/2009 | Holland et al. ............ 264/248 |

\* cited by examiner

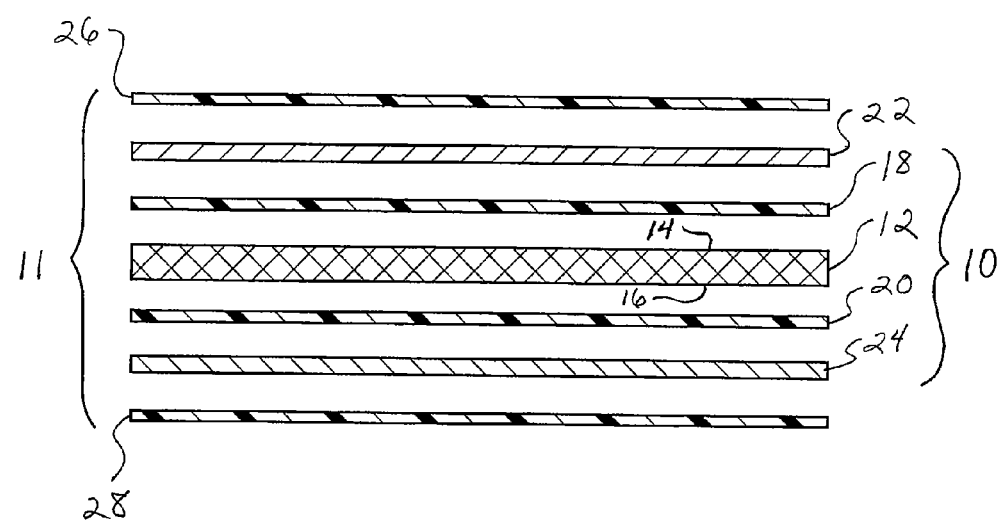

PROCESS FOR MAKING LIGHTWEIGHT LAMINATED PANEL MATERIAL FOR CONSTRUCTION OF CARGO CONTAINERS

CROSS-REFERENCES TO RELATED APPLICATIONS

This application is based upon and claims priority from Provisional Patent Application No. 61/350,855, filed Jun. 2, 2010, which is incorporated by reference in its entirety herein.

BACKGROUND

This invention relates generally to cargo containers, and more particularly relates to a method for making lightweight laminated panels for cargo containers for aircraft or seagoing vessels.

An aircraft cargo container, also known as a Unit Load Device (ULD), is indispensable in commercial wide body aircraft operation. A wide body airliner typically may carry from six to sixteen aircraft cargo containers every flight. Since fuel expense is one of the major operating costs of operation of airlines, the weight of such aircraft cargo containers has a significant financial impact. Consequently, makers of aircraft cargo containers have been striving to build containers as light as practically possible. An aircraft cargo container typically includes a pallet, a metal frame, a number of body panels and a door. The weight of the body panels accounts for a significant portion of the tare weight of an aircraft cargo container. Therefore, minimizing the weight of panel materials can generate considerable cost savings for air carriers.

The body panels of an aircraft cargo container ideally should be sufficiently stiff so that the container would not deform too much to breach the permissible envelope and cause interference with and damage to an aircraft structure, should have high impact and puncture resistance, should have good protection against water, and should have good resistance to UV and common chemicals encountered in the operational environment of commercial airports. The surface of the body panels also should be easy to bond with logos, decals and repair patches. Material from which such body panels are constructed ideally should have high strength, be lightweight, be of low cost, and should have adequate fire resistance that meets the pertinent FAA requirements as detailed in 14 CFR, part 25, Appendix F.

The latest trend has been to make aircraft cargo container panels out of composite materials. One approach has been to laminate high performance soft fabric, such as para-aramid fabric available under the trademark KEVLAR from E. I. du Pont de Nemours and Company or under the trademark TWARON from Teijin Aramid BV, or ultra high molecular weight polyethylene (UHMW PE) available under the brand name SPECTRA from Honeywell, or under the trademark DYNEEMA from DSM of the Netherlands, for example, with surface protective films such polyolefin, polyurethane or nylon films. Because the surface of para-aramid or UHMW PE fabric is quite difficult to bond with most of the aforementioned protective films, lamination of the material presents many significant challenges. Employing too much heat during lamination may cause the protective film to thin excessively thus exposing the underlying fabric, compromising the UV resistance, or causing undesirable discoloration. Applying too much pressure during lamination may produce strong print-through of fabric on the film surface, making it difficult to bond logos, decals or repair patches to the outer protective film. Applying too little heat on the other hand generally results in poor adhesion between the fabric and the protective films and consequently unsatisfactory durability. It would be desirable to provide a process for reliably making satisfactory lightweight, laminated aircraft cargo container body panel material for use in construction of panels for cargo containers. The present invention meets these and other needs.

SUMMARY OF THE INVENTION

Briefly and in general terms, the present invention provides for a process for making a lightweight laminated panel material for construction of cargo containers, that provides for improved bonding of the layers of the lightweight laminated panel material, in order to achieve construction of a high strength, lightweight and low cost construction laminated panel material, that has required stiffness, high impact strength, puncture resistance, fire resistance, water resistance, resistance to UV and common chemicals, and an exterior surface with an improved ability to bond with logos, decals and repair patches.

Accordingly, the present invention provides for a process for making a lightweight laminated panel material for construction of cargo containers, involving the steps of providing an inner core high performance fabric layer, disposing first and second film adhesive layers over the first and second sides of the core high performance fabric layer, and disposing first and second protective surface film layers over the first and second film adhesive layers to form a pre-lamination stack. First and second release layers are disposed over the first and second protective surface film layers, and the pre-lamination stack and the release layers are heated to a predetermined temperature. The pre-lamination stack is then compressed, and the pre-lamination stack is maintained at the selected temperature and under pressure for a predetermined period of time to form a lamination stack. The lamination stack is then cooled to an intermediate temperature, after which pressure on the lamination stack is released, and then the lamination stack is cooled to room temperature, after which the release layers are removed.

In a presently preferred aspect, the release layers are selected from the group consisting of release film, release paper, and release fabric. In another presently preferred aspect, the predetermined temperature to which the pre-lamination stack is heated is above a bond line temperature of the film adhesive layers, and is preferably below a temperature at which excessive thinning of the surface protective films would occur. In another presently preferred aspect, the predetermined temperature to which the pre-lamination stack is heated is approximately 215° F. to approximately 300° F. In another presently preferred aspect, the pre-lamination stack is compressed under a pressure of approximately between 15 and 60 psi pressure. In another presently preferred aspect, the predetermined period of time in which the pre-lamination stack is maintained at the selected temperature and under pressure is approximately 45 to 60 minutes.

In another presently preferred aspect, the intermediate temperature to which the lamination stack is cooled is a temperature below approximately 160° F. In another presently preferred aspect, the first and second film adhesive layers have a bond line temperature of approximately 215° F. to approximately 300° F. In another presently preferred aspect, the protective surface film layers are formed from polyurethane film, metallized polyurethane film, polyolefin film, metallized polyolefin film, nylon film, or metallized nylon film. In another presently preferred aspect, the inner core high performance fabric layer is formed from a para-aramid fabric or ultra high molecular weight polyethylene fabric.

Other features and advantages of the present invention will become more apparent from the following detailed description of the preferred embodiments in conjunction with the accompanying drawing, which illustrates the construction of a lightweight laminated panel material for construction of cargo containers, according to the invention.

BRIEF DESCRIPTION OF THE DRAWINGS

The FIGURE is an exploded sectional view of layers of a material that can be formed for used in construction of lightweight panels for cargo containers, according to the invention.

DETAILED DESCRIPTION OF THE PREFERRED EMBODIMENTS

Referring to the FIGURE, which is provided by way of example, and not by way of limitation, a lightweight laminated panel material 10 for construction of cargo containers can be constructed by forming a pre-lamination stack or assembly 11 including an inner layer 12 of a core high performance fabric having a first side 14 and a second side 16, a first layer 18 of a film adhesive disposed on the first side of the inner layer of core high performance fabric, and a second layer 20 of a film adhesive disposed on the second side of the inner layer of core high performance fabric. The pre-lamination stack or assembly also includes a first layer 22 of a protective surface film disposed over the first layer of film adhesive, and a second layer 24 of a protective surface film disposed over the second layer of film adhesive. The pre-lamination stack or assembly also includes a first release layer 26 preferably placed over the first protective surface film layer, and a second release layer 28 preferably placed over the second protective surface film layer, as will be further explained below.

The inner layer of a core high performance fabric can be a para-aramid fabric, such as the para-aramid fabric available under the trademark KEVLAR from E. I. du Pont de Nemours and Company, or the para-aramid fabric available under the trademark TWARON from Teijin Aramid BV, or a ultra high molecular weight polyethylene (UHMW PE) available under the brand name SPECTRA from Honeywell, or the ultra high molecular weight polyethylene available under the trademark DYNEEMA from DSM of the Netherlands, for example. Suitable film adhesives typically have a bond line temperature (the temperature at which the adhesive is activated, i.e. the temperature required for the adhesive to achieve adhesive bonding) of approximately 215° F. to approximately 300° F., and are available from International Composites Technologies under the trade names Adhesive P/N 20-10079-101, 20-10079-103 or 20-10079-105, for example. The first and second surface protective films can be formed of polyurethane film, metallized polyurethane film, polyolefin film, metallized polyolefin film, nylon film, or metallized nylon film, for example.

The fabric, film adhesive and protective surface films may be assembled batch-wise by applying the layers individually, such as in a flat bed laminator, for example, or the fabric, film adhesive and protective surface films can be pre-assembled (pre-lamination) in a continuous roll using a roller. The pre-lamination fabric-film sheet or roll only needs to have sufficient integrity such that it can be easily cut and handled.

Multiple layers of fabric-adhesive-film assemblies (ranging from 2 to 40) of a desirable length and width may be stacked for lamination, with a release or separator film, paper or fabric inserted in between individual fabric-film assemblies and processed together by pressing them together at a desired temperature to cause the film adhesive layers to bond the protective surface films reliably to the inner layer of high performance fabric. The release or separator film, paper or fabric should be suitable for the heat pressing process and allows for easy removal of the laminated fabric after the lamination process. Suitable materials that can be used as release or separator films are available from Airtech, and suitable release papers are available from Wausau, for example. The very top and bottom face of the stack should also be lined with a release or separator film, paper or fabric. A pair of metal plates, also known as caul plates, often made from aluminum, slightly large than the footprint of the laminate assembly and of a thickness ranging between 0.09" and 0.25", can be used to sandwich the fabric-film stack of lightweight laminated panel material, for ease of handling and heat pressing.

The temperature for lamination should be at least above the bond line temperature of the film adhesive, but below the temperature at which excessive thinning of the surface protective films would occur. Typically, for a number of different film adhesives employed in the lamination of the proposed panel materials, the temperature for lamination ranges approximately 215° F. to approximately 300° F. Typically the flat press is preheated to the desired temperature, and the platen temperature is allowed to stabilize such as over a period of approximately 1-2 hours, for example. The fabric-adhesive-film stack or stacks, along with the caul plates, are then placed in the press, and the stack or stacks are compressed in the press by applying a pressure of approximately between 15 and 60 psi pressure. The exact amount of pressure depends on the desired surface texture. The material is allowed to stay at the selected temperature and pressure for approximately 45 to 60 minutes. The material is then allowed to cool naturally, or can be cooled rapidly, such as with cooling water, oil or air, for example. Typically the pressure of the press is then released and the material is removed from the press when the temperature of the stack or stacks of the fabric-adhesive-film material drops below approximately 160° F. The laminated panel material can then be allowed to cool to room temperature and removed from the release or separator film, paper or fabric.

It will be apparent from the foregoing that while particular forms of the invention have been illustrated and described, various modifications can be made without departing from the spirit and scope of the invention. Accordingly, it is not intended that the invention be limited, except as by the appended claims.

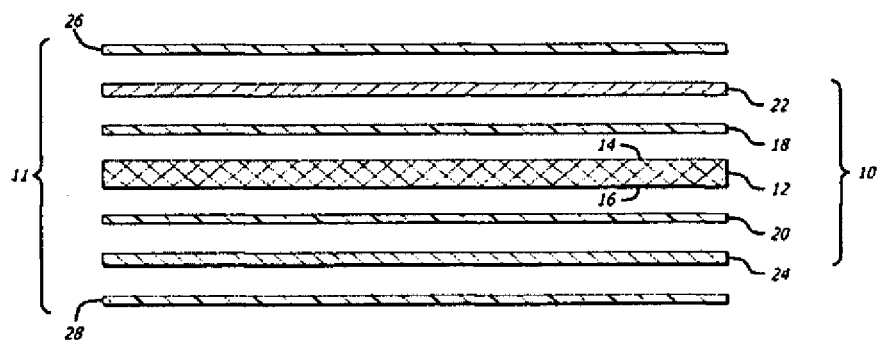

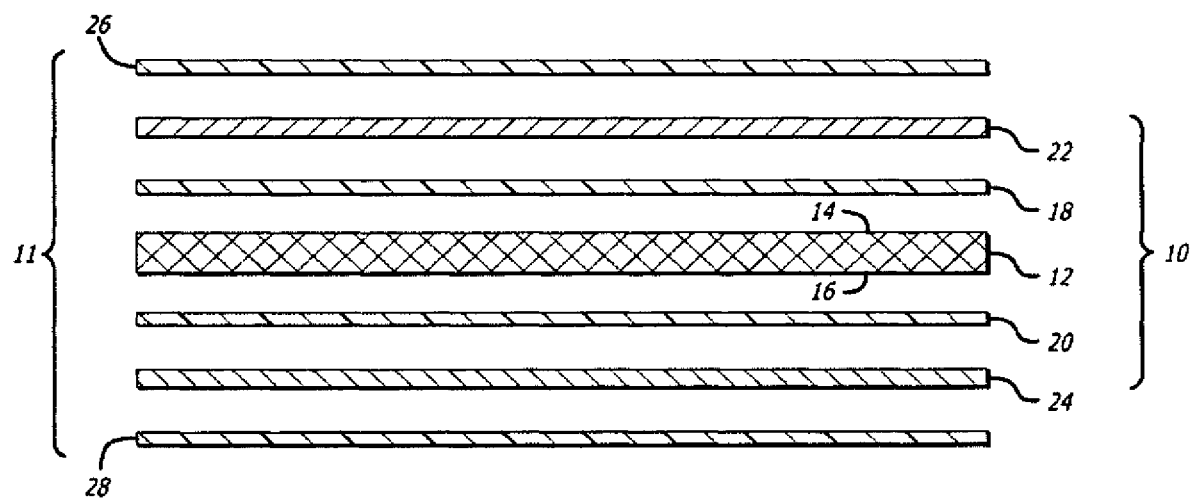

What is claimed is:

1. A process for making lightweight laminated panel material for construction of cargo containers, comprising:
   providing an inner core high performance fabric layer having a first side and a second side;
   disposing a first film adhesive layer on the first side of the core high performance fabric layer;
   disposing a second film adhesive layer on the second side of the core high performance fabric layer;
   disposing a first protective surface film layer over the first film adhesive layer;
   disposing a second protective surface film layer over the second film adhesive layer, said inner core high performance fabric layer, said first film adhesive layer, said second film adhesive layer, said first protective surface film layer, and said second protective surface film layer forming a pre-lamination stack, wherein said first and second protective surface film layers are formed from a material selected from the group consisting of polyurethane film, metallized polyurethane film, nylon film, and metallized nylon film;

disposing a first release layer over said first protective surface film layer;

disposing a second release layer over said second protective surface film layer;

heating said pre-lamination stack and said first and second release layers to a predetermined temperature, wherein said predetermined temperature is above a bond line temperature of the film adhesive layers;

compressing said pre-lamination stack under a predetermined pressure;

maintaining said pre-lamination stack at said predetermined temperature and under said predetermined pressure for a predetermined period of time to form a lamination stack;

cooling the lamination stack to a temperature below approximately 160° F. while maintaining said pre-lamination stack under said predetermined pressure;

releasing said predetermined pressure from the lamination stack;

cooling the lamination stack to room temperature; and removing said first and second release layers.

2. The process of claim 1, wherein said first and second release layers are selected from the group consisting of release film, release paper, and release fabric.

3. The process of claim 1, wherein said predetermined temperature is below a temperature at which excessive thinning of the surface protective films would occur.

4. The process of claim 1, wherein said step of compressing said pre-lamination stack comprises compressing said pre-lamination stack under a pressure of approximately between 15 and 60 psi pressure.

5. The process of claim 1, wherein said predetermined period of time is approximately 45 to 60 minutes.

6. The process of claim 1, wherein said first and second first and second film adhesive layers have a bond line temperature of approximately 215° F. to approximately 300° F.

7. The process of claim 1, wherein said inner core high performance fabric layer is formed from a material selected from the group consisting of a para-aramid fabric and ultra high molecular weight polyethylene fabric.

8. A process for making lightweight laminated panel material for construction of cargo containers, comprising:

providing an inner core high performance fabric layer having a first side and a second side, wherein said inner core high performance fabric layer is formed from a material selected from the group consisting of a para-aramid fabric and ultra high molecular weight polyethylene fabric;

disposing a first film adhesive layer on the first side of the core high performance fabric layer, said first film adhesive layer having a bond line temperature of approximately 215° F. to approximately 300° F.;

disposing a second film adhesive layer on the second side of the core high performance fabric layer, said second film adhesive layer having a bond line temperature of approximately 215° F. to approximately 300° F.;

disposing a first protective surface film layer over the first film adhesive layer;

disposing a second protective surface film layer over the second film adhesive layer, said inner core high performance fabric layer, said first film adhesive layer, said second film adhesive layer, said first protective surface film layer, and said second protective surface film layer forming a pre-lamination stack, wherein said first and second protective surface film layers are formed from a material selected from the group consisting of polyurethane film, metallized polyurethane film, nylon film, and metallized nylon film;

disposing a first release layer over said first protective surface film layer;

disposing a second release layer over said second protective surface film layer;

heating said pre-lamination stack and said first and second release layers to a predetermined temperature above the bond line temperatures of the film adhesive layers;

compressing said pre-lamination stack under a predetermined pressure;

maintaining said pre-lamination stack at said predetermined temperature and under said predetermined pressure for a predetermined period of time to form a lamination stack;

cooling the lamination stack to a temperature below approximately 160° F. while maintaining said pre-lamination stack under said predetermined pressure;

releasing said predetermined pressure from the lamination stack;

cooling the lamination stack to room temperature; and removing said first and second release layers.

9. The process of claim 8, wherein said first and second release layers are selected from the group consisting of release film, release paper, and release fabric.

10. The process of claim 8, wherein said predetermined temperature is below a temperature at which excessive thinning of the surface protective films would occur.

11. The process of claim 8, wherein said step of compressing said pre-lamination stack comprises compressing said pre-lamination stack under a pressure of approximately between 15 and 60 psi pressure.

12. The process of claim 8, wherein said predetermined period of time is approximately 45 to 60 minutes.

* * * * *

UNITED STATES PATENT AND TRADEMARK OFFICE
CERTIFICATE OF CORRECTION

PATENT NO.      : 8,784,605 B2                         Page 1 of 3
APPLICATION NO. : 13/151191
DATED           : July 22, 2014
INVENTOR(S)     : Richard L. Fingerhut It is certified that error appears in the above-identified patent and that said Letters Patent is hereby corrected as shown below:

Delete title page and substitute therefore with the attached title page consisting of the corrected illustrative figure.

In the Drawings

Delete informal drawing sheet and insert instead the attached formal drawing sheet 1/1.

Signed and Sealed this
Twenty-seventh Day of January, 2015

Michelle K. Lee
*Deputy Director of the United States Patent and Trademark Office*

(12) United States Patent
Fingerhut

(10) Patent No.: US 8,784,605 B2
(45) Date of Patent: Jul. 22, 2014

(54) PROCESS FOR MAKING LIGHTWEIGHT LAMINATED PANEL MATERIAL FOR CONSTRUCTION OF CARGO CONTAINERS

(75) Inventor: Richard L. Fingerhut, Tarzana, CA (US)

(73) Assignee: International Composites Technologies, Inc., Compton, CA (US)

(*) Notice: Subject to any disclaimer, the term of this patent is extended or adjusted under 35 U.S.C. 154(b) by 464 days.

(21) Appl. No.: 13/151,191

(22) Filed: Jun. 1, 2011

(65) Prior Publication Data
US 2012/0055625 A1 Mar. 8, 2012

Related U.S. Application Data

(60) Provisional application No. 61/350,855, filed on Jun. 2, 2010.

(51) Int. Cl.
B32B 37/00 (2006.01)
B29C 65/00 (2006.01)
(52) U.S. Cl.
USPC .......... 156/311; 156/289; 156/308.2
(58) Field of Classification Search
USPC ........ 156/289, 306.6, 308.2, 309.6, 323, 311, 156/324
See application file for complete search history.

(56) References Cited

U.S. PATENT DOCUMENTS

| | | |
|---|---|---|
| 4,212,406 A | 7/1980 | Mittelmann |
| 4,833,771 A | 5/1989 | Dunwoodie |
| 5,102,723 A | 4/1992 | Pepin |
| 5,180,078 A | 1/1993 | Looker |
| 5,195,701 A | 3/1993 | Willan |
| 5,249,534 A | 10/1993 | Sacks |
| 5,267,665 A | 12/1993 | Sanai et al. |
| 5,312,182 A | 5/1994 | Mlakar et al |
| 5,328,268 A | 7/1994 | LaFleur |
| 5,360,129 A | 11/1994 | Lee |
| RE34,892 E | 4/1995 | Dunwoodie |
| 5,413,410 A | 5/1995 | Mlakar |
| 5,421,804 A | 6/1995 | LaFleur |
| 5,425,456 A | 6/1995 | Erickson |
| 5,522,340 A | 6/1996 | Skogman |
| 5,542,765 A | 8/1996 | Smith et al. |

(Continued)

FOREIGN PATENT DOCUMENTS

| | | |
|---|---|---|
| EP | 0301624 A2 | 2/1989 |
| WO | 8803743 A1 | 5/1988 |
| WO | 2006124825 A2 | 11/2006 |

OTHER PUBLICATIONS

EPO, International Search Report and Written Opinion for PCT International Application No. PCT/US2011/038888 dated Sep. 13, 2011.

Primary Examiner — John Goff
(74) Attorney, Agent, or Firm — Fulwider Patton LLP

(57) ABSTRACT

A process for making a lightweight laminated panel material for construction of cargo containers includes providing a high performance fabric layer, placing film adhesive layers over both sides of the high performance fabric layer, placing protective surface film layers over the film adhesive layers to form a pre-lamination stack, and placing release layers over the protective surface film layers. The pre-lamination stack is heated, compressed, and maintained at the temperature and under pressure to form a lamination stack. The lamination stack is cooled to an intermediate temperature and released from pressure, cooled further, and the release layers are removed.

12 Claims, 1 Drawing Sheet